United States Patent
Freeman et al.

(10) Patent No.: US 7,042,628 B1
(45) Date of Patent: *May 9, 2006

(54) VARIABLE ELECTROCHROMIC OPTICAL ATTENUATOR

(75) Inventors: William Freeman, Castro Valley, CA (US); Steve Wang, San Jose, CA (US); Frank H. Levinson, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/688,356

(22) Filed: Oct. 17, 2003

Related U.S. Application Data

(60) Provisional application No. 60/419,473, filed on Oct. 18, 2002.

(51) Int. Cl.
*G02F 1/00* (2006.01)

(52) U.S. Cl. ........................ 359/322; 359/265

(58) Field of Classification Search ........ 359/265–275, 359/280, 256, 281, 282, 322, 324, 323, 246, 359/248, 255, 251, 252, 254

See application file for complete search history.

(56) References Cited

U.S. PATENT DOCUMENTS

| | | | |
|---|---|---|---|
| 4,989,938 A | 2/1991 | Tamulevich | |
| 5,015,057 A | 5/1991 | Rumbaugh et al. | |
| 5,436,921 A | 7/1995 | Corio | |
| 5,598,293 A | 1/1997 | Green | |
| 6,205,280 B1 | 3/2001 | Wagoner et al. | |
| 6,266,474 B1 | 7/2001 | Han et al. | |
| 6,275,320 B1 | 8/2001 | Dhuler et al. | |
| 6,353,494 B1 * | 3/2002 | Hamada | 359/322 |
| 6,437,901 B1 | 8/2002 | Kobayashi et al. | |
| 6,437,904 B1 * | 8/2002 | Reeder | 359/322 |
| 6,522,456 B1 * | 2/2003 | Chen et al. | 359/322 |
| 6,700,694 B1 * | 3/2004 | Zou et al. | 359/281 |

\* cited by examiner

*Primary Examiner*—Scott J. Sugarman
*Assistant Examiner*—Tuyen Tra
(74) *Attorney, Agent, or Firm*—Workman Nydegger

(57) ABSTRACT

A variable electrochromic optical attenuator is provided that is used to control the intensity of a light signal. The electrochromic optical attenuator comprises a semi-transparent electrochromic device, and a plurality of electrodes configured to conduct electricity to the electrochromic device such that the transparency of the electrochromic device will be affected by an amount proportional to the magnitude of the electricity applied to the plurality of electrodes. The intensity of the light signal transmitted through the electrochromic device is affected by an amount proportional to the magnitude of the electricity applied to the plurality of electrodes. The electrochromic optical attenuator also includes at least one polarizing element having an optical polarization axis, wherein the polarizing element transmits a portion of the light signal proportional to the angular difference between the optical polarization axis of the light signal and that of the polarizing element. In one embodiment, the electrochromic optical attenuator is employed in a laser package that includes a laser, a pair of polarizing elements, and a faraday rotator.

25 Claims, 2 Drawing Sheets

VARIABLE ELECTROCHROMIC OPTICAL ATTENUATOR

This application claims the benefit of priority to U.S. Provisional Application No. 60/419,473, filed on Oct. 18, 2002, the disclosure of which is herein incorporated by reference.

BACKGROUND OF THE INVENTION

1. Field of the Invention

This invention relates generally to the field of optical attenuation devices for use in optical systems. In particular, the present invention relates to a variable optical attenuator that requires little space and has no moving parts.

2. Relevant Technology

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals are resistant to electromagnetic interference that would otherwise interfere with electrical signals. Light also provides a more secure signal because it does not emanate the type of high frequency components often experienced with conductor-based electrical signals. Light also can be conducted over greater distances without the signal loss typically associated with electrical signals on a copper conductor.

Many conventional electrical networks are being upgraded to optical networks to take advantage of the increased speed and efficiency. Optical communication networks use lasers to create light which is then modulated to convey information. One of the many components of an optical communications network is an optical attenuator. Optical attenuators control the intensity of one or more wavelengths of light within an optical system. On occasion, it is necessary to recalibrate or replace one or more of the lasers generating light in the system. To avoid data corruption, it is necessary to completely extinguish the laser's light from the optical system before recalibration or replacement. Optical attenuators are capable of extinguishing the laser's light by blocking it from entering the remainder of the optical system. There are numerous general methods of attenuating or completely extinguishing light, including polarization, reflection, diffusion, etc. In addition, it is often necessary to control the intensity of a particular wavelength or channel of light entering a fiber. Although it is possible to simply adjust the electrical current feeding a laser to adjust the output intensity, this is not desirable because such a method of attenuation will affect the bandwidth capabilities of the laser. Therefore, it is necessary to use a variable optical attenuator to attenuate or adjust the output intensity of a particular laser.

Polarization is often used in optical attenuators to attenuate light signals within an optical system. One type of optical attenuator that utilizes polarization is a mechanical attenuator that contains two or more polarizing elements to attenuate the light signal. When the polarizing elements are rotated with respect to one another the output light is attenuated as a function of the angle between the polarization axis of the polarizing elements. For two polarizing elements, this phenomena follows Malus' law and is stated mathematically: $I_{out}=I_{in} \cos^2 \theta$, where $\theta$ is the angular difference between the polarization axis of the two polarizing elements. Attenuators of this type typically include some form of rotation mechanism to rotate one of the polarizing elements with respect to the other one. It is necessary for the optical attenuator to be variable such that a user can adjust the amount of attenuation for a particular situation. A polarizing element may be a standard polarizer or a crystal containing polarization properties. These crystals include quartz, BBO, YVO4, and the like. Although these types of attenuators are effective at attenuating the light signal, it is undesirable to include moving parts in an optical attenuator. Mechanical devices typically wear out over time and often introduce drift characteristics. Mechanical devices also take up relatively large amounts of precious space and are therefore not suitable for many optical applications.

Therefore, there is a need in the industry for a variable optical attenuator that has no moving parts and takes up very little space. In addition, the optical attenuator should be capable of being incorporated into an optical transceiver package.

SUMMARY OF THE INVENTION

The present invention is directed to a variable electrochromic optical attenuator that is used to control the intensity of a light signal. The electrochromic optical attenuator comprises a semi-transparent electrochromic device, and a plurality of electrodes configured to conduct electricity to the electrochromic device such that the transparency of the electrochromic device will be affected by an amount proportional to the magnitude of the electricity applied to the plurality of electrodes. The intensity of the light signal transmitted through the electrochromic device is affected by an amount proportional to the magnitude of the electricity applied to the plurality of electrodes. The electrochromic optical attenuator includes at least one polarizing element having an optical polarization axis, wherein the polarizing element transmits a portion of the light signal proportional to the angular difference between the optical polarization axis of the light signal and that of the polarizing element.

In one embodiment, the electrochromic optical attenuator is employed as part of a laser package that includes a laser, a pair of polarizing elements, and a faraday rotator. The electrochromic optical attenuator in the laser package can also be employed as part of an optical transceiver package.

In a method of attenuating and isolating a light signal according to the invention, a light signal is directed from a laser to a variable electrochromic optical attenuator and transmitted therethrough, with the intensity of the light signal transmitted being affected by an amount proportional to the magnitude of electricity applied to a plurality of electrodes configured to conduct electricity to an electrochromic device of the optical attenuator. The light signal is then directed from the electrochromic optical attenuator to a first polarizing element. The light signal is then directed from the first polarizing element to a faraday rotator, and then to a second polarizing element.

These and other features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

In general, the present invention relates to a variable electrochromic optical attenuator that is used to control the intensity of light transmitting through the attenuator. As will be described in further detail below, the variable electrochromic optical attenuator is capable of precisely adjusting the intensity of a light beam from 0 to 100% in response to an electrical voltage. Also, while embodiments of the present invention are described in the context of optical networking, it will be appreciated that the teachings of the present invention are applicable to other applications as well.

Reference will now be made to the drawings to describe various embodiments of the invention. It is to be understood that the drawings are diagrammatic and schematic representations of the embodiments, and are not limiting of the present invention, nor are they necessarily drawn to scale.

Figure 1:
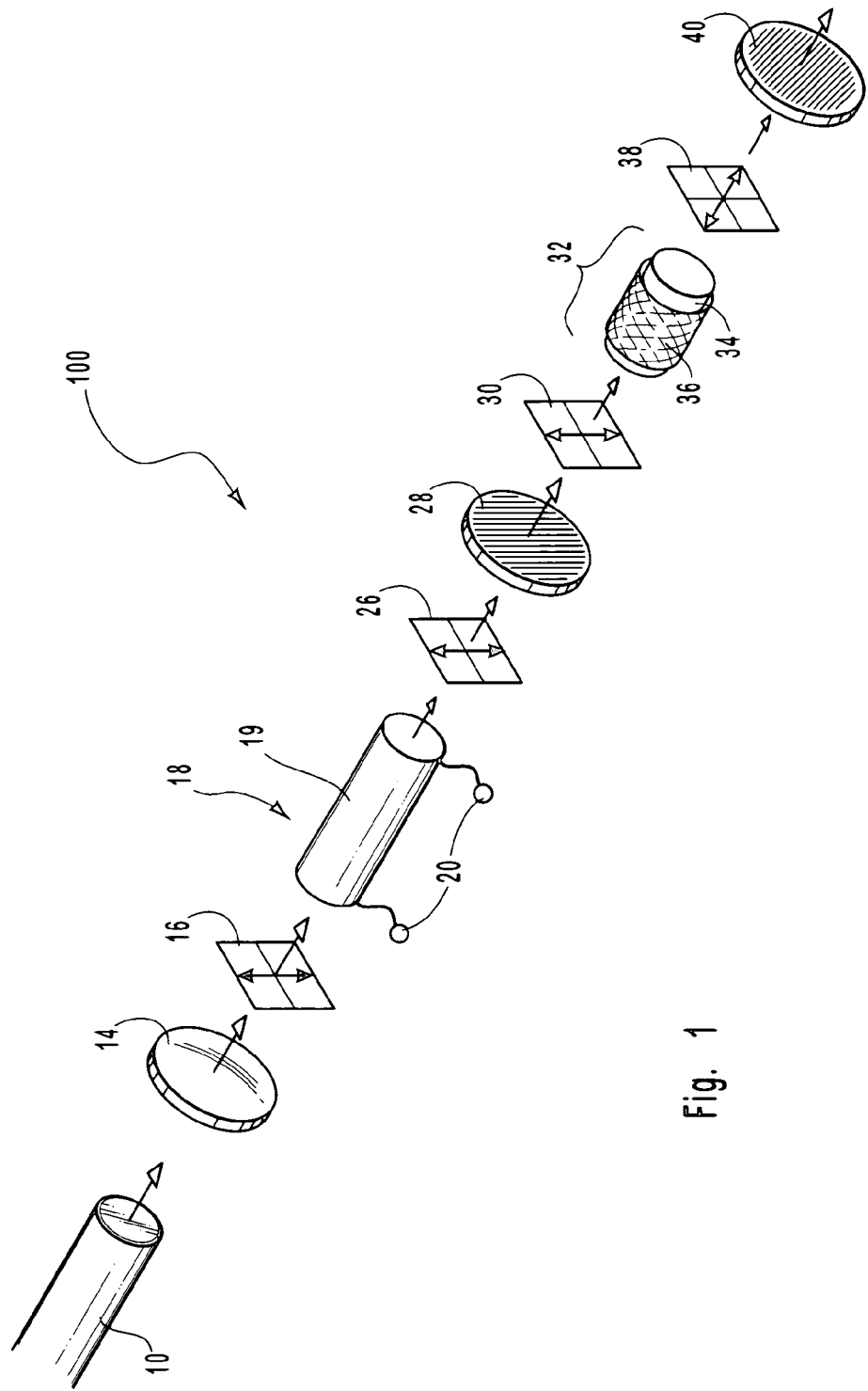
FIG. 1 illustrates a perspective view of one presently preferred embodiment of a laser package including an electrochromic optical attenuator.
Figure 2:
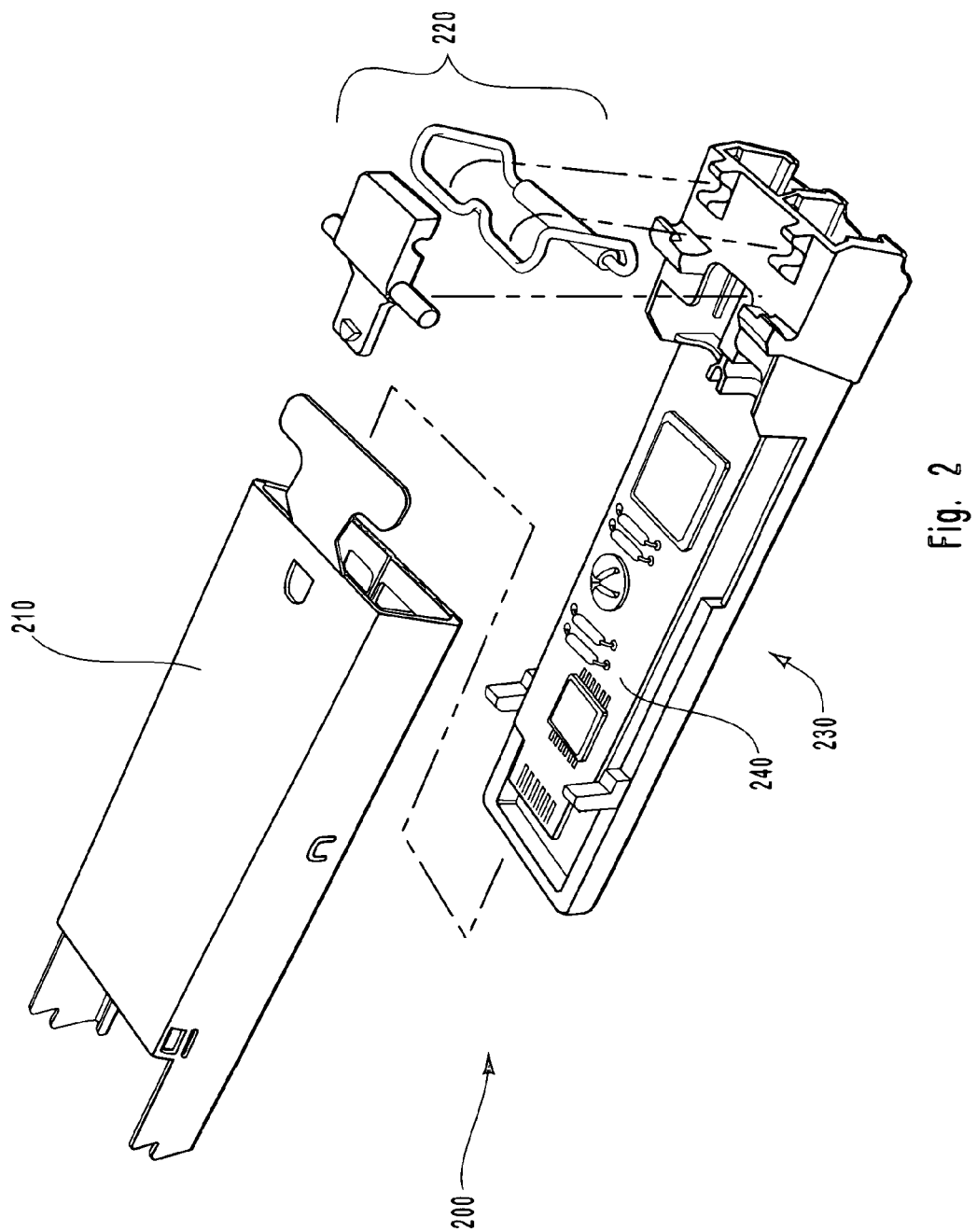
FIG. 2 illustrates an exploded view of an optical transceiver package for housing the laser package of FIG. 1.

Referring first to FIG. 1, a perspective view of one embodiment of a laser package including an electrochromic optical attenuator is designated generally at 100. The laser package 100 is designed for use in an optical transceiver package as illustrated in FIG. 2. A laser 10 generates a light signal of a particular wavelength range. Although illustrated in a cylindrical manner, the laser 10 could be a semiconductor laser, a gas laser or any other type of laser depending on the application parameters. In this embodiment, the laser 10 is a distributed feedback laser which emits a light signal that is essentially limited to one wavelength. The light signal generated by the laser 10 is polarized and has a particular polarization axis. The light signal then passes through a window or lens 14. The window or lens 14 is used to reduce reflections and aberrations that may be present in the original light signal. The light signal maintains the same polarity after passing through the window 14. In this embodiment, the laser is oriented to produce a vertical linear polarization as indicated by a first chart 16.

With continued reference to FIG. 1, the light signal is transmitted into a variable electrochromic optical attenuator 18. The electrochromic optical attenuator 18 is capable of attenuating the intensity of the light signal in response to an electrical voltage. Although illustrated in a cylindrical manner, the electrochromic optical attenuator 18 may be any form of electrochromic attenuator device. The electrochromic optical attenuator 18 includes a semi-transparent electrochromic device 19 and a pair of electrodes 20. When a voltage is applied across the electrodes 20, the electrochromic optical attenuator 18 tints the electrochromic device 19 by an amount proportional to the magnitude of the voltage. The tinting of the electrochromic device 19 causes more of the light signal to be reflected rather than transmitted. Therefore, the intensity of the light signal transmitted though the electrochromic optical attenuator 18 is mathematically related to the magnitude of the voltage applied to the electrodes 20. The polarization of the light signal exiting the electrochromic optical attenuator 18 is unchanged, as indicated by a second chart 26.

With continued reference to FIG. 1, the light signal is then transmitted through a first polarizing element 28. A polarizing element is defined as any element with a linear optical polarity such as a polarizer or certain types of crystals. Light that passes through a polarizing element is diminished unless the axis of polarization of the polarizing element is the same as that of the incident light. For example, if horizontally polarized light is transmitted into a vertical polarizing element, the polarizing element will block essentially all light from passing through the polarizing element. The light signal exiting the first polarizing element 28 is vertically polarized because the first polarizing element 28 is oriented to produce vertically polarized light. The polarization status of the light signal exiting the first polarizing element 28 is illustrated in a third chart 30.

The light signal then enters a faraday rotator 32. The faraday rotator 32 includes a garnet 34 and a magnetic material 36. The magnetic material 36 is a permanent magnet or a premagnetized hard ferromagnetic material that exhibits remnant magnetization. The garnet 34 and the magnetic material 36 induce a magnetic field across the light signal transmitting through the faraday rotator 32. The magnetic field has the effect of rotating the plane of polarization of the light signal. The faraday rotator 32 rotates the plane of polarization by a fixed amount related to the magnitude of the permanent magnetic field generated by the magnetic material 36. In this embodiment, the faraday rotator 32 rotates the plane of polarization by 45 degrees in the clockwise direction, as illustrated in a fourth chart 38. The light signal then passes through a second polarizing element 40 which is oriented in a direction to allow the desired portion of the light signal to pass. The first polarizing element 28, faraday rotator 32, and the second polarizing element 40 effectively isolate a portion of the incident light signal from the laser 10. This isolation is important for avoiding interference and distortion of the light signal during use in an optical communications system. The isolation elements are not required elements for the electrochromic attenuator but are included to illustrate a preferred embodiment.

Reference is next made to FIG. 2, which illustrates an exploded view of an optical transceiver package for housing the laser package of FIG. 1, designated generally at 200. The optical transceiver package 200 includes a housing 210, a latch system 220 and a module 230. The module 230 further includes a printed circuit board 240 containing the optical and electrical elements for an optical transmitter or laser package and an optical receiver. The laser package illustrated in FIG. 1 can be incorporated as the transmitter in the illustrated transceiver package 200 to form a preferred embodiment of a transceiver package.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device, comprising:
    a polarizing element having an optical polarization axis, wherein the polarizing element transmits a portion of a light signal proportional to the angular difference between an optical polarization axis of the light signal and an optical polarization axis of the polarizing element; and a variable electrochromic optical attenuator comprising:
an electrochromic device; and
a pair of electrodes in electrical communication with the electrochromic device such that the relative transparency of the electrochromic device corresponds to the magnitude of a voltage applied across the pair of electrodes;

wherein a relative intensity of the light signal transmitted out of the electrochromic device corresponds to the magnitude of the voltage applied across the pair of electrodes.

2. The optical device of claim 1, wherein the polarizing element comprises a polarizer having a linear optical polarity.

3. A laser package comprising:
a laser configured to generate a light signal having an optical polarization axis;
a variable electrochromic optical attenuator comprising:
an electrochromic device; and
a pair of electrodes in electrical communication with the electrochromic device such that the relative transparency of the electrochromic device corresponds to the magnitude of a voltage applied across the pair of electrodes, wherein a relative intensity of the light signal transmitted out of the electrochromic device corresponds to the magnitude of the voltage applied across the pair of electrodes; and
a polarizing element having an optical polarization axis, wherein the polarizing element transmits a portion of the light signal proportional to the angular difference between the optical polarization axis of the light signal and the optical polarization axis of the polarizing element.

4. The laser package of claim 3, wherein the laser comprises a semiconductor laser or a gas laser.

5. The laser package of claim 3, wherein the laser comprises a distributed feedback laser.

6. The laser package of claim 3, wherein the polarizing element comprises a polarizer having a linear optical polarity.

7. The laser package of claim 3, further comprising a window or lens interposed between the laser and the variable electrochromic optical attenuator.

8. The laser package of claim 3 further comprising an optical transceiver package.

9. A laser package for optical attenuation and isolation, comprising:
a laser configured to generate a light signal having an optical polarization axis;
a variable electrochromic optical attenuator comprising:
a semi-transparent electrochromic device; and
a plurality of electrodes configured to conduct electricity to the electrochromic device such that the transparency of the electrochromic device will be affected by an amount proportional to the magnitude of the electricity applied to the plurality of electrodes, wherein the intensity of the light signal transmitted through the semi-transparent electrochromic device will also be affected by an amount proportional to the magnitude of the electricity applied to the plurality of electrodes;
a first polarizing element in optical communication with the electrochromic optical attenuator and having an optical polarization axis, wherein the first polarizing element transmits a portion of the light signal proportional to the angular difference between the optical polarization axis of the light signal and that of the first polarizing element;

a faraday rotator in optical communication with the first polarizing element and comprising:
a semi-transparent material; and
a magnetic material at least partially surrounding the semi-transparent material and configured to apply a magnetic force to a light signal that is passed through the semi-transparent material; and a second polarizing element in optical communication with the faraday rotator and having an optical polarization axis, wherein the second polarizing element transmits a portion of an incident light signal proportional to the angular difference between an optical polarization axis of the incident light signal and that of the second polarizing element.

10. The laser package of claim 9, wherein the laser comprises a semiconductor laser or a gas laser.

11. The laser package of claim 9, wherein the laser comprises a distributed feedback laser.

12. The laser package of claim 9, wherein the polarizing elements each comprise a polarizer having a linear optical polarity.

13. The laser package of claim 9, wherein the semi-transparent material comprises garnet.

14. The laser package of claim 9, wherein the magnetic material of the faraday rotator comprises a permanent magnet or a premagnetized hard ferromagnetic material.

15. The laser package of claim 9, further comprising a window or lens interposed between the laser and the variable electrochromic optical attenuator.

16. The laser package of claim 9 further comprising an optical transceiver package.

17. A method of attenuating and isolating a light signal, comprising:
directing a light signal from a laser to a variable electrochromic optical attenuator, the electrochromic optical attenuator comprising:
a semi-transparent electrochromic device; and
a plurality of electrodes configured to conduct electricity to the electrochromic device such that the transparency of the electrochromic device will be affected by an amount proportional to the magnitude of the electricity applied to the plurality of electrodes;
transmitting at least a portion of the light signal through the electrochromic device, wherein the intensity of the light signal transmitted through the electrochromic device is affected by an amount proportional to the magnitude of the electricity applied to the plurality of electrodes;
directing the light signal from the electrochromic device to a first polarizing element;
directing the light signal from the first polarizing element to a faraday rotator, the faraday rotator comprising:
a semi-transparent material; and
a magnetic material at least partially surrounding the semi-transparent material; and directing the light signal from the faraday rotator to a second polarizing element.

18. The method of claim 17, wherein the laser comprises a semiconductor laser or a gas laser.

19. The method of claim 17, wherein the laser comprises a distributed feedback laser.

20. The method of claim 17, wherein the polarizing elements each comprise a polarizer having a linear optical polarity.

21. An optical transceiver, comprising:
a housing; and
a module attached to the housing and comprising:
  a printed circuit board;
  an optical receiver in communication with the printed circuit board; and
  an optical transmitter package in communication with the printed circuit board and comprising:
    an optical transmitter;
    a variable electrochromic optical attenuator arranged to receive an optical signal from the optical transmitter;
    a first polarizing element arranged to receive an optical output from the variable electrochromic optical attenuator;
    a rotator arranged to receive an optical output from the first polarizing element; and
    a second polarizing element configured to receive an optical output from the rotator.

22. The optical transceiver as recited in claim 21, wherein the optical transmitter comprises a laser.

23. The optical transceiver as recited in claim 21, wherein the rotator comprises a Faraday rotator.

24. The optical transceiver as recited in claim 21, wherein an input to the variable electrochromic optical attenuator has the same polarization as a corresponding output from the variable electrochromic optical attenuator.

25. The optical transceiver as recited in claim 21, wherein a relative intensity of an optical output of the variable electrochromic optical attenuator corresponds to the magnitude of a voltage applied to the variable electrochromic optical attenuator.

* * * * *